United States Patent [19]
Wolf

[11] Patent Number: 4,518,899
[45] Date of Patent: May 21, 1985

[54] PROCESS AND APPARATUS FOR CORRELATING STARTUP AND CUTOFF PERIODS OF DIFFERENT INDUCTION MOTORS WITH ONE ANOTHER

[75] Inventor: Horst Wolf, Albershausen, Fed. Rep. of Germany

[73] Assignee: Zinser Textilmaschinen GmbH, Ebersbach/Fils, Fed. Rep. of Germany

[21] Appl. No.: 589,408

[22] Filed: Mar. 14, 1984

[30] Foreign Application Priority Data

Mar. 16, 1983 [DE] Fed. Rep. of Germany ....... 3309370

[51] Int. Cl.³ .............................................. H02P 5/46
[52] U.S. Cl. ....................................... 318/68; 318/51; 318/86
[58] Field of Search ................ 318/68, 77, 78, 86, 318/101, 45, 46, 47, 51, 59, 60, 61, 62, 63, 64

[56] References Cited

U.S. PATENT DOCUMENTS

| | | | |
|---|---|---|---|
| 2,558,885 | 7/1951 | Stevens et al. | 318/86 X |
| 3,118,097 | 1/1964 | Hettler | 318/77 X |
| 3,248,628 | 4/1966 | Rogers | 318/78 |
| 3,253,203 | 5/1966 | Bardwell | 318/372 X |
| 3,849,718 | 11/1974 | Forster et al. | 318/138 X |
| 4,308,489 | 12/1981 | Bergmann | 318/77 |
| 4,326,154 | 4/1982 | Lewis et al. | 318/376 |

FOREIGN PATENT DOCUMENTS

| | | | |
|---|---|---|---|
| 2904406 | 8/1979 | Fed. Rep. of Germany | 318/68 |
| 2024464 | 1/1980 | United Kingdom | 318/77 |

*Primary Examiner*—Bernard Roskoski
*Assistant Examiner*—Bentsu Ro
*Attorney, Agent, or Firm*—Karl F. Ross; Herbert Dubno

[57] ABSTRACT

In textile machinery wherein two or more loads—such as transport rollers of a tension frame and a bank of spindles carrying take-up spools—are driven by respective three-phase motors of the asynchronous (induction) type at speeds which are different from each other but are to be mutually correlated during an entire operating cycle including a startup and a cutoff period, the motor with the shorter acceleration time is slowed down during startup to let it reach its operating speed substantially at the same time as the other motor whereas the motor with the longer deceleration time is braked during cutoff in order to reach standstill substantially simultaneously with the other motor. The slowdown during startup and the braking during cutoff can be controlled by a comparator which determines deviations of the speed ratio of the two motors from a predetermined reference value.

10 Claims, 4 Drawing Figures

PROCESS AND APPARATUS FOR CORRELATING STARTUP AND CUTOFF PERIODS OF DIFFERENT INDUCTION MOTORS WITH ONE ANOTHER

FIELD OF THE INVENTION

My present invention relates to a process for correlating the startup and cutoff periods of different motors of the asynchronous (induction) type as used for driving respective loads in textile machinery which are to rotate at different speeds but with substantial maintenance of a predetermined speed ratio throughout an entire operating cycle including startup and cutoff. My invention further relates to an apparatus for implementing that process.

BACKGROUND OF THE INVENTION

In spinning and twisting machines in which sliver or yarn is to be wound upon a take-up spool on being supplied by a tension frame, for example, the transport rollers of the tension frame and the spindle of each take-up spool should maintain a more or less invariable speed ratio in order to maintain the thread material under a predetermined tension. The maintenance of such a speed ratio can be achieved by driving the transport rollers and the spindles by respective synchronous motors which, however, do require a certain adjustment especially in spindle speed throughout the operation in view of the progressively increasing spool diameter. Moreover, it is difficult to maintain the desired speed ratio of such synchronous motors during the startup and cutoff periods.

When squirrel-cage or other 3-phase motors of the asynchronous type are being used to drive these loads, their acceleration times during startup and their deceleration times during cutoff often differ significantly from one another. In particular, a motor with higher power-to-load ratio and with lower operating speed generally attains full speed faster than a motor with lower power-to-load ratio and higher operating speed, provided that both motors are being energized at the same time with the full available supply voltage. Similarly, the return to standstill from their respective operating speeds will take different times from the instant of de-energization, depending on the operating speeds and on the inertia of the associated loads.

OBJECTS OF THE INVENTION

An important object of my present invention, therefore, is to provide a process for correlating the speeds of two (or possibly more) motors of the asynchronous type, e.g. squirrel-cage motors, in a manner substantially equalizing both their acceleration times and their deceleration times so as to maintain at least their average speed ratio essentially constant during startup and cutoff.

A related object is to provide an apparatus for so controlling the speeds of the two (or more) motors during startup and cutoff as to let them reach operating speed and return to standstill substantially simultaneously.

A more particular object of my invention is to provide a process and an apparatus for the purpose set forth in which not only the average speed ratio but also the instantaneous speed ratio of the motors is maintained substantially constant during startup and cutoff.

SUMMARY OF THE INVENTION

In accordance with the process aspects of my invention, the supply voltage of the motor having the shorter acceleration time is modulated during the startup period so as to let it reach its operating speed substantially concurrently with the other motor; conversely, the motor with the longer deceleration time is braked —continuously or intermittently—during the cutoff period to let it reach standstill substantially concurrently with the other motor.

In many instances, though not invariably, one motor of the two here considered will have the shorter acceleration time while the other motor will have the longer deceleration time. Thus, in particular, a first motor driving the transport rollers of a tension frame delivering the thread material to the take-up spools will have a lower operating speed and will reach it more quickly, with constant energization, than a second motor driving the spindles of the take-up spools whose operating speed will be higher. It may be noted that, in this particular instance, the growing diameters of the take-up spools may require a progressively decreasing speed of the second motor during steady-state operation which can be brought about by a correspondingly increasing slip of the second motor in order to keep the thread tension substantially constant; this, however, is not particularly significant in the context of my present invention in which it will be assumed that the speed ratios at the end of the startup period and at the beginning of the cutoff period are approximately the same.

With this assumption, I can use a predetermined reference value of the speed ratio of the two motors for comparison with their actual speed ratio as measured in the startup and cutoff periods to determine the extent to which the energization of the faster-accelerating motor on startup and the rotary speed of the slower-decelerating motor on cutoff must be reduced in order to maintain their speed ratio at or near the desired value.

An apparatus according to my invention, designed to implement the aforedescribed process, thus includes voltage-modulating means in an energizing circuit of the faster-accelerating motor for delaying the attainment of the operating speed thereof in the startup period, brake means able to coact in the cutoff period with the slower-decelerating motor to advance its return to standstill, and control means for so actuating the voltage-modulating means in the startup period and the braking means in the cutoff period to let these motors reach their operating speeds and return to standstill about simultaneously.

If the speeds of more than two motors are to be correlated in the manner set forth, the motor or motors with the longest acceleration time will be fully energized during startup while the remaining motor or motors will have their supply voltages modulated for the purpose described. Conversely, on cutoff, the motor or motors with the shortest deceleration time will be allowed to return to standstill without supplemental braking while the remaining motor or motors will be subjected to such braking.

BRIEF DESCRIPTION OF THE DRAWING

The above and other features of my invention will now be described in detail with reference to the accompanying drawing in which.

SPECIFIC DESCRIPTION

Figure 1:
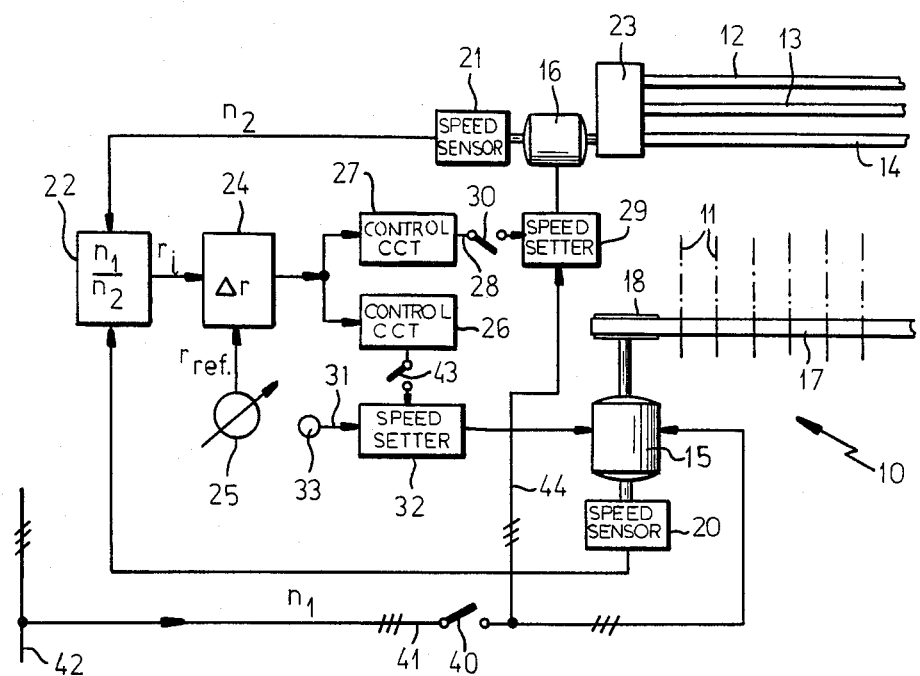
FIG. 1 is a block diagram of a textile machine provided with a speed-correlating apparatus according to my invention.

As shown in FIG. 1, a motor 15 of the squirrel-cage type drives a bank of spindles 11 by way of an endless transmission belt 17 which is wound about a pulley 18 on the output shaft of that motor and is in frictional contact with a whorl at the lower end of each spindle 11, as is well known in the art. The illustrated spindle bank may extend along one side of a ring spinning machine, generally designated 10, provided with a similar spindle bank along its opposite side; another motor, identical with motor 15 and driven in parallel therewith, may operate this second spindle bank.

A tension frame of conventional structure comprises three cascaded roller pairs of which only the lower-level transport rollers 12–14, interconnected through a transmission 23, have been illustrated. These transport rollers 12–14 are driven by a motor 16, also of the squirrel-cage type, at a speed $n_2$ which in steady-state operation is substantially lower than the operating speed $n_1$ of motor 15. The two motor speeds are continuously sensed by respective tachometers 20 and 21 emitting corresponding output signals to a calculator 22 which determines their instant ratio $r_i = n_1/n_2$. Thus, for example, tachometers 20 and 21 may have output signals in the form of pulse trains of different cadences which are logarithmically converted in calculator 22 into respective voltages whose difference represents the ratio $r_i$. A comparator 24 receives the ratio $r_i$ from calculator 22 and a reference signal $r_{ref}$ from a source 25 to determine their difference $\Delta r = r_i - r_{ref}$. Comparator 24 works into two control circuits 26 and 27 whose outputs are cut off during steady-state operation by respective switches 30 and 43. Tension frame 12–14 and its drive motor 16 may, of course, also be duplicated in the presence of a second spindle bank.

Figure 2:
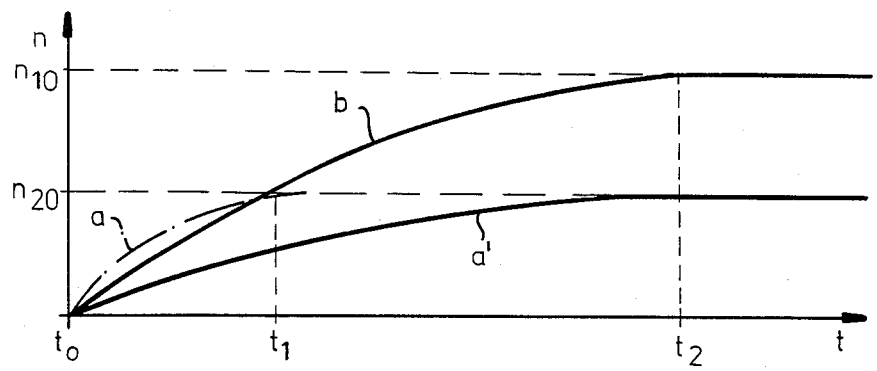
FIG. 2 is a graph illustrating the operation of the apparatus of FIG. 1 during a startup period.

Motors 15 and 16 are energized, during operation, from a 3-phase line 42 via a branch 41 and a main switch 40 whose initial closure determines the beginning of a startup period. With this switch closed, branch 41 extends directly to the stator windings of motor 15 and via another branch 44, by way of a speed setter 29, to corresponding windings of motor 16. During that startup period, closure of a switch 30 connects an output lead 28 of circuit 27 to a control input of speed setter 29 in order to slow down its time of acceleration to a normal speed $n_{20}$, as indicated in FIG. 2. Without such a slowdown, motor 16 would reach the speed level $n_{20}$ along a curve a, i.e. at a time $t_1$ following by a relatively short interval the cut-in time $t_0$. Speed level $n_{20}$ of motor 16 is shown in FIG. 2 to lie well below a normal level $n_{10}$ of motor 15 which the latter, upon closure of switch 40, reaches only at a time $t_2$ along a curve b. Motor 16 generally will be more powerful than motor 15 and, having to reach a lower speed level $n_{20}$, would accelerate to that level much faster—if switch 30 were left open—than would motor 15 in order to reach its normal operating speed $n_{10}$.

In accordance with my present invention, speed setter 29 extends the acceleration time of motor 16 along a curve a' so that this motor reaches its speed $n_{20}$ also at time $t_2$, i.e. concurrently with the attainment of full speed by motor 15. Speed setter 29 may comprise, for example, an interrupter which under the control of circuit 27, and thus in response to the deviation $\Delta r$ of the actual speed ratio $r_i$ from the reference value $r_{ref}$, diminishes the rate of acceleration of motor 16 so as to reduce to zero, from time to time, the magnitude of $\Delta r$. Speed setter 29 might also comprise a 3-phase transformer with variable coupling factor or with slidable taps on its secondary windings, or else respective potentiometers inserted in each phase lead. A further possibility is to vary the phase angle in each supply-frequency cycle during which motor 16 is being energized.

In any event, the speed ratio $r_i$ can be kept as close as possible to the desired value—given by $n_{10}/n_{20}$—throughout the startup period $t_0$–$t_2$.

Figure 3:
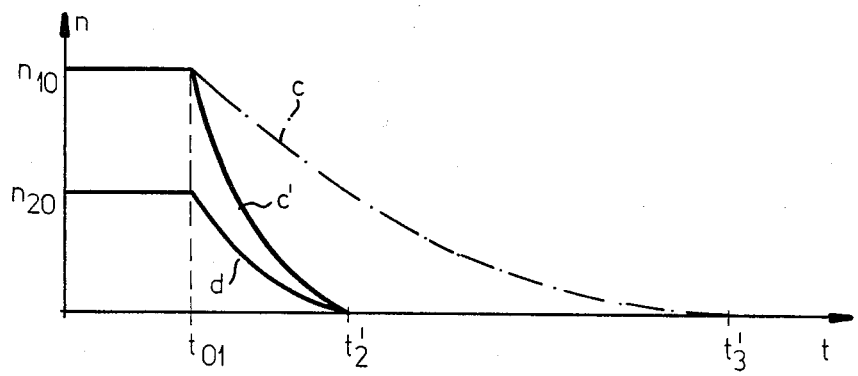
FIG. 3 is a similar graph relating to the operation of the apparatus during a cutoff period.

In the subsequent steady-state period it is assumed that the relative operating speeds of motors 15 and 16 need not be significantly changed (though this could be brought about by conventional means if necessary, for example, to maintain a given rate of twist) so that, at the end of the steady-state period marked by the opening of switch 40, the two motors still have the same speeds $n_{10}$, $n_{20}$, respectively. As indicated in FIG. 3, the beginning of the cutoff period occurs at a time $t_{01}$ with immediate de-energization of both motors. However, as likewise indicated in FIG. 3, motor 16 is assumed to come down to standstill along a curve d at a time $t_2'$ whereas motor 15, with no outside intervention, would coast to zero speed at a much longer time $t_3'$ along a curve c. In order to equalize these two deceleration times, motor 15 is subjected in this cutoff period to a braking effect by means of a speed setter 32, controlled by circuit 26 upon closure of a switch 43, whereupon output signals of circuit 26 appearing on a lead 31 connect a d-c source 33 across one of the phase windings of motor 15 to perform that braking action. Again, the action of speed setter 32 may be intermittent—with periodic elimination of the deviation $\Delta r$—or continuous at a controlled rate. As a result, motor 15 decelerates along a curve c' so as to reach standstill concurrently with motor 16 at time $t_2'$. If at time $t_{01}$ the operating speed of motor 15 has been significantly changed in a predetermined manner from its initial high level $n_{10}$, reference value $r_{ref}$ may be correspondingly altered in the cutoff period.

The use of braking current to expedite the slowdown of motor 15 is again one of several possibilities. Thus, for example, a mechanical braking action could be exerted upon the rotor shaft of motor 15 through an electromagnetic brake 34 (see FIG. 4) under the control of circuit 26. Such a brake can be quickly released and is therefore well suited for the contemplated use.

Figure 4:
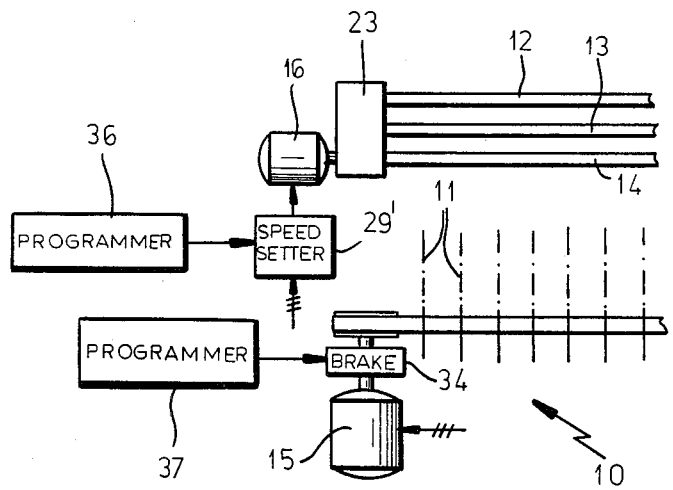
FIG. 4 is a block diagram similar to FIG. 1, illustrating a modification.

In some instances the requirements for the maintenance of a predetermined speed ratio are less stringent. In such a case, as illustrated in FIG. 4, the calculating stages 22 and 24 may be replaced by respective programmers 36 and 37 controlling a speed setter 29', in the energizing circuit of motor 16, and a speed setter such as brake 34 (or device 32, 33 of FIG. 1) associated with motor 15. The two programmers are designed to maintain the desired speed ratio in the assumption that motor 15 accelerates along curve b (FIG. 2) during startup and that motor 16 decelerates along curve d (FIG. 3) during cutoff, without actual measurement of the instantaneous motor speeds during these periods.

Machine 10, operating e.g. as a ring spinner or twister, may be modified with the use of a separate drive motor 15 for each spindle 11. With identical drive motors 15 of induction (squirrel-cage or reluctance) type, energized in parallel and assumed to have substantially the same characteristics, the speed of only one motor 15 will have to be monitored by tachometer 20 in the system of FIG. 1 while all these motors are being concurrently braked in the cutoff period.

The closure of switches 30 and 43 during the startup period and the cutoff period, respectively, may be brought about automatically with the aid of respective pulse sensors detecting the closure and the opening of main switch 40. Switch 30 may be reopened by an output signal from tachometer 20, indicating that motor 15 has reached its speed level $n_{10}$, while switch 43 can be reopened by a zero-speed signal from the same tachometer. In a simpler case, the length of switch closure may be determined by respective timers measuring the predetermined intervals $t_0-t_2$ (FIG. 2) and $t_{01}-t_2'$ (FIG. 3), respectively.

My invention is also applicable to other types of textile machinery equipped with flyers, stretchers, carders or the like, e.g. to double-thread twining machines.

I claim:

1. A process for mutually correlating, during a startup period and a cutoff period, the speeds of two asynchronous alternating current induction motors driving different loads in textile machinery whose speed ratio is to remain at least approximately constant in all phases of operation, said motors having different acceleration times to reach their respective operating speeds with full supply voltage on startup and having different deceleration times to reach standstill after de-energization on cutoff, comprising the steps of:
(a) on startup, modulating the alternating current supply voltage of the motor with the shorter acceleration time to let it reach its operating speed substantially concurrently with the other motor; and
(b) on cutoff, braking the motor with the longer deceleration time to let it reach standstill substantially concurrently with the other motor.

2. A process as defined in claim 1 wherein step (a) involves an intermittent interruption of said supply voltage.

3. A process as defined in claim 1 wherein step (b) involves an at least intermittent energization of the motor to be braked with direct current.

4. A process as defined in claim 1 wherein step (b) involves the use of an electromagnetic brake.

5. A process as defined in claim 1 wherein steps (a) and (b) each involve a sensing of the two motor speeds, a determination of any deviation of the ratio of said motor speeds from a predetermined value, and a control of the supply voltage in step (a) and of the braking in step (b) in a sense tending to cancel said deviation.

6. In textile machinery including two asynchronous induction motors driving respective loads at different speeds whose ratio is to remain at least approximately constant throughout an operating cycle including a startup period and a cutoff period, said motors having different acceleration times to reach their respective operating speeds with full supply voltage on startup and having different deceleration times to reach standstill after de-energization on cutoff, the combination therewith of an apparatus for substantially equalizing the startup and cutoff periods of said motors, comprising:

voltage-modulating means in an alternating current energizing circuit of the motor with the shorter acceleration time for delaying the attainment of the operating speed thereof in said startup period;

brake means able to coact in said cutoff period with the motor with the longer deceleration time to advance the return thereof to standstill; and control means for so actuating said voltage-modulating means in said startup period and said brake means in said cutoff period to let said motors reach their operating speeds and return to standstill substantially simultaneously.

7. The combination defined in claim 6 wherein said motors are provided with respective speed sensors monitoring their operating speeds, said control means comprising arithmetic means for calculating the speed ratio of said motors from respective output signals of said speed sensors and determining deviations of the calculated speed ratio from a predetermined value.

8. The combination defined in claim 6 wherein said control means comprises respective programmers for the actuation of said voltage-modulating means and of said brake means.

9. The combination defined in claim 6 wherein said brake means comprises a source of direct current intermittently connectable in said cutoff period across a stator winding of the motor with the longer deceleration time.

10. The combination defined in claim 6 wherein said brake means comprises an electromagnetic brake engageable in said cutoff period with a shaft of the motor with the longer deceleration time.

* * * * *